United States Patent [19]

Bogart

[11] 4,308,654

[45] Jan. 5, 1982

[54] METHODS FOR ASSEMBLING PERMEATORS

[75] Inventor: Marlowe C. Bogart, Research Triangle Park, N.C.

[73] Assignee: Monsanto Company, St. Louis, Mo.

[21] Appl. No.: 78,526

[22] Filed: Sep. 24, 1979

[51] Int. Cl.$^3$ ............................................. B23P 11/02
[52] U.S. Cl. ....................................... 29/451; 29/235; 29/234; 55/16
[58] Field of Search ................. 29/450, 451, 235, 234; 55/16

[56] References Cited

U.S. PATENT DOCUMENTS

| | | | |
|---|---|---|---|
| 3,339,341 | 9/1967 | Maxwell et al. | 55/16 |
| 3,442,002 | 5/1969 | Geary, Jr. et al. | 29/450 |
| 3,921,273 | 11/1975 | Kondo | 29/451 X |
| 4,092,769 | 6/1978 | Dickson, Jr. et al. | 29/234 |

*Primary Examiner*—Charlie T. Moon

*Attorney, Agent, or Firm*—Thomas E. Kelley; Norman L. Balmer; Howard C. Stanley

[57] ABSTRACT

Methods for inserting a bundle of hollow fiber membranes into a permeator shell are provided which methods present minimal risk of damage to the hollow fiber membranes and enable high packing factors of hollow fiber membranes within the permeator shell to be achieved. In the methods, a bundle of hollow fiber membranes is surrounded by a substantially fluid impermeable, flexible envelope. The interior of the envelope is provided at a lower total pressure than the pressure at the exterior of the envelope such that the flexible envelope is drawn into contact with the bundle and laterally compacts the bundle. The envelope containing the bundle is inserted into a permeator shell while maintaining the pressure differential. The flexible envelope may be retained within or may be withdrawn from the permeator shell.

15 Claims, 3 Drawing Figures

METHODS FOR ASSEMBLING PERMEATORS

This invention pertains to methods for assembling permeators containing hollow fiber membranes for fluid separations. More particularly this invention pertains to methods for inserting hollow fiber membranes within a permeator shell. Advantageously, the methods of this invention are relatively non-complex and provide minimal risk of damage to the integrity of the often very fragile hollow fiber membranes.

Membranes in the form of hollow fibers are frequently advantageous for use in permeators in view of the relatively high membrane surface area which can be achieved per unit volume of the permeator. Moreover, hollow fiber membranes can be self-supporting and can withstand high pressure differentials across their walls. Although hollow fiber membranes can withstand high pressure differentials, they are often very fragile. Damage to the hollow fiber membranes may result in a loss of separation capabilities and/or in a loss of strength which may be required to withstand the operating conditions for the intended fluid separation operation. For instance, anisotropic membranes having a thin, dense skin (or barrier layer) supported by more open wall structure are often desirable due to the relatively small resistance to fluid passage provided by the walls of the anisotropic hollow fiber membranes. However, this thin skin may be particularly susceptible to damage which will adversely affect the performance of the hollow fiber membranes.

Permeators containing hollow fiber membranes are usually characterized by having a plurality of hollow fiber membranes generally longitudinally oriented to form an elongated bundle wherein the bundle is positioned within a substantially fluid impermeable, tubular shell. Means are provided within the shell to prevent fluid communication between the feed side and the permeate exit side of the hollow fiber membrane except through the walls of the hollow fiber membrane. Hence, generally at least one end of each of the hollow fiber membranes in the permeator is encased, or embedded, in an essentially fluidtight relationship in a tube sheet such that only the bores of the hollow fiber membranes are in fluid communication through the tube sheet. The tube sheet is often in an essentially fluid tight relationship with the shell. The other end of each of the hollow fiber membranes is also in an essentially fluid tight relationship between the exterior and bore of the membrane. The desired relationship at the other end of the hollow fiber membranes can be achieved by embedding the other end of each of the hollow fiber membranes in a tube sheet, which may be a separate tube sheet or the same tube sheet as in which the first end of each of the hollow fiber membranes is embedded. Alternatively, the other end of each of the hollow fiber membranes may be sealed in an essentially fluid tight manner.

The two approaches which have primarily been proposed for permeators employing hollow fiber membranes are transversely-fed permeators and axially-fed permeators. In transversely-fed permeators such as radially-fed permeators the fluid at the exterior of the hollow fibers primarily passes through the permeator transverse to the predominant longitudinal orientation of the hollow fiber membranes. In axially-fed permeators, the fluid at the exterior of the hollow fiber membranes primarily passes through the permeator in the same direction as the longitudinal orientation of the hollow fibers. Transverse flow of the fluid among the hollow fiber membranes in axially-fed permeators is at least partially due to dispersions caused by back-pressures to fluid flow in the permeator, that is, the path of least resistance for the fluid flow must be transverse to the orientation of the hollow fiber membranes in order to obtain the desired transverse flow. Frequently, the efficiencies of permeators, particularly axially-fed permeators, are enhanced when the hollow fiber membranes are tightly packed within the permeator to enhance the back pressures which promote the dispersion of the fluid in the bundle and to minimize hollow fiber movement which can form fluid by-pass channels. Moreover, with the more tightly packed bundles, advantages are obtained in that greater amounts of membrane surface area for effecting separations can be provided per unit volume of permeator. Although advantages of providing more tightly packed bundles can clearly be seen, it is also apparent that the assembly of permeators containing such more tightly packed bundles may also increase the risk of damage to the hollow fiber membranes.

Geary, et al., in U.S. Pat. No. 3,442,002, patented May 6, 1969, disclose a method for assembling a permeator wherein a bundle of hollow fiber membranes is surrounded with a flexible porous sleeve which extends along the bundle and constricts the bundle laterally to maintain a compact bundle. The patentees state that the sleeve should be of a material, or a construction, which is capable of shrinkage or shortening at least in the transverse peripheral dimension to give a uniform constraining compacting action on and along the enclosed bundle of hollow fiber membranes. The patentees prefer the use of a circularly knit fabric sleeve which is capable of considerable reduction in transverse peripheral dimension when the sleeve is placed under tension longitudinally. It is still possible, however, that when such knit fabric sleeves are placed under longitudinal tension, the peripheral compacting forces provided by the sleeve may be more severe at some zones along the length of the bundle as compared to those compacting forces at other zones along the length of the bundle. Moreover, the use of knit sleeves may provide a localized pressure on a hollow fiber membrane at the point of contact with the filament or yarn of the sleeve. Thus, damage may still occur to the hollow fiber membranes even though the bundle may appear to be relatively uniformly compacted. Moreover, with sleeves having a more open knit, portions of the hollow fiber membranes at the exterior of the bundle may be exposed through the sleeve thereby presenting a risk that they may be damaged during the handling of the bundle and its insertion into the shell. Also, the presence of substantially non-compressible elements on, or within, the bundle such as tube sheets, can prevent achieving the desired lateral compaction.

Accordingly, alternative methods for laterally compacting a bundle of hollow fiber membranes are sought to facilitate the insertion of the bundle into a permeator shell even with the presence of substantially non-compressible elements on, or within, the bundle. Advantageously, these methods should provide maximum protection to the hollow fiber membranes and avoid, to the extent possible, localized areas within the bundle which are subjected to greater forces than those in other areas within the bundle during this compacting. Moreover, these methods should be capable of being performed quickly, easily and without the exercise of an undue level of skill on the part of the fabricator.

In accordance with this invention methods are provided for inserting an elongated bundle of hollow fiber membranes into an elongated tubular permeator shell. In the methods, a bundle is surrounded with a substantially fluid impermeable, flexible envelope. The interior of the flexible envelope is then provided at a lower total pressure than the pressure at the exterior of the flexible envelope such that the flexible envelope is drawn into contact with the bundle and laterally compacts the bundle. Since the compaction is provided by a pressure differential across the wall of the flexible envelope, the forces on the hollow fiber membranes at the points of contact may be substantially equal over the bundle. The flexible envelope containing the bundle is inserted into the shell while maintaining the pressure differential across the wall of the flexible envelope. Once the envelope is inserted within the shell, the pressure differential across the wall of the flexible envelope need no longer be maintained. The flexible envelope may be retained within the shell permanently, or it may be removed. If it is desired to remove the flexible envelope, its removal may often be facilitated by pressurizing the interior of the flexible envelope such that it expands away from the hollow fiber membranes to reduce contact with the hollow fiber membranes. Generally, once the flexible envelope is expanded, the pressurization of the interior of the flexible envelope can be terminated.

BRIEF DESCRIPTION OF THE DRAWINGS

FIG. 2 illustrates a plurality of hollow fibers with varying crimp amplitude. FIG. 3 illustrates a hollow fiber with low crimp amplitude.

Figure 1:
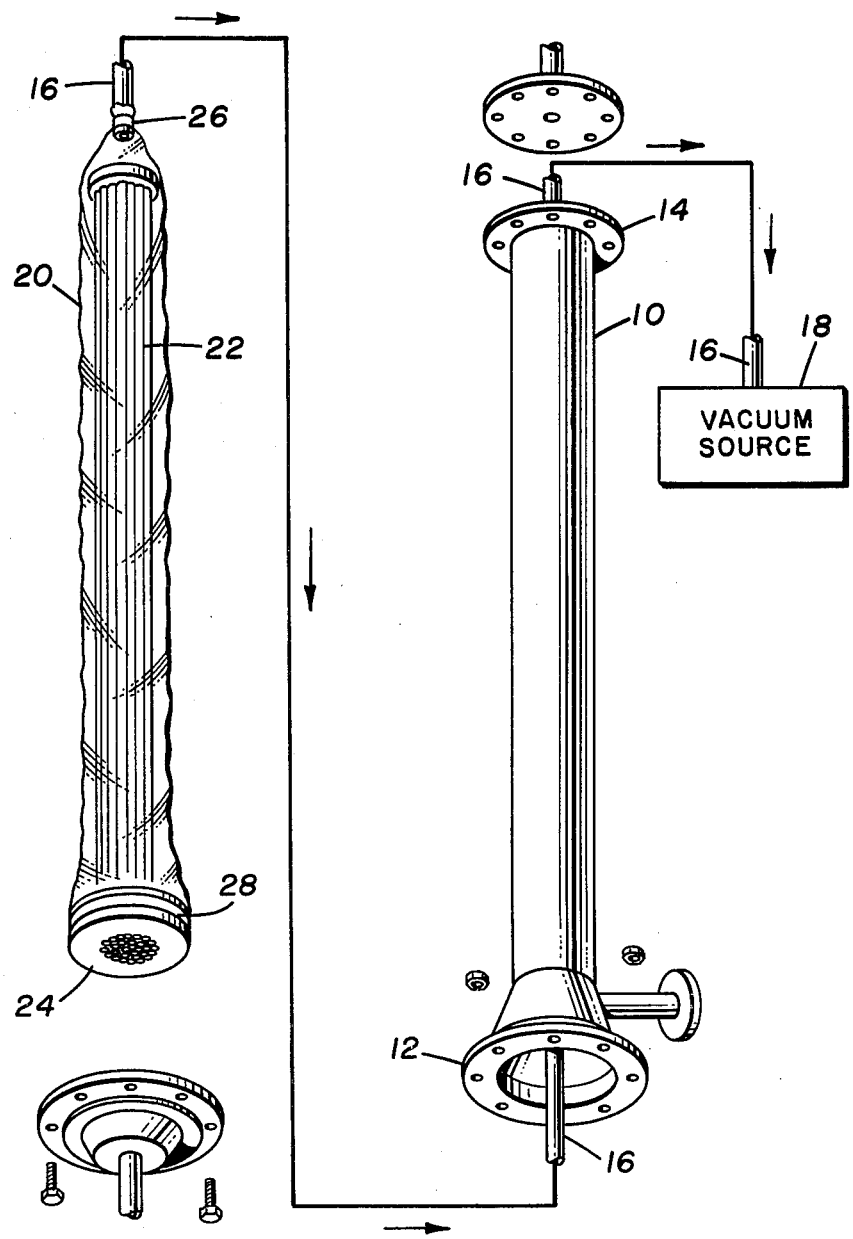
FIG. 1 is a schematic depiction of an arrangement suitable for performing a method in accordance with this invention.

The flexible envelope should exhibit sufficient strength to withstand the pressure differential to which the envelope will be subjected during assembly of the permeator. The flexible envelope should also be constructed of a material which has sufficient abrasion resistance and toughness that the flexible envelope does not perforate or become unduly weakened before and during the insertion of the bundle into the permeator shell. Especially when it is desired to remove the flexible envelope from the bundle after the insertion of the bundle into the permeator shell, the surfaces of the flexible envelope should be relatively smooth in order to minimize abrasion damage to the hollow fiber membranes. In some instances, a lubricant (e.g., solid, gel or liquid) on the exterior or interior or both surfaces of the flexible envelope may be useful to facilitate the placing of the flexible envelope around the bundle and/or the insertion of the bundle into the permeator shell and/or the removal of the flexible envelope from the permeator shell after insertion of the bundle. Similarly, a lubricant may be placed on the interior surface of the permeator shell. Generally, the use of a lubricant on the hollow fiber membranes is avoided unless the lubricant can be readily removed from the hollow fiber membranes since the lubricant may adversely affect the performance of the hollow fiber membranes. The flexible envelope may be made of any suitable, essentially fluid impermeable material which may be natural, reconstituted, or synthetic, and is frequently constructed of polymeric material, especially polyethylene, polypropylene, polyvinyl chloride, polyvinylidene chloride, polyethylene terephthalate, and the like. The flexible envelope may also contain fillers, reinforcements, plasticizers, pigments, antioxidants, antistatic agents, lubricants and the like to provide desirable handling, strength, chemical resistance, stability, and the like. When the flexible envelope is to be retained in the permeator permanently, the material of the flexible envelope should be compatible with the fluids expected to be present in the permeator. The flexible envelope is preferably relatively thin in order to achieve the high flexibility sought. Often, the wall thickness of the flexible envelope is less than about 300 microns, say, about 50 to 250 microns.

The flexible envelope is positioned around the bundle and encases the bundle in an essentially fluid tight manner such that the pressure differential across the wall of the flexible envelope can be achieved. The flexible envelope may be comprised of a sheet which is wrapped around the bundle and sealed, or it may be a preformed, tubular structure adapted to receive the bundle. Preferably, the inside dimensions of the flexible enclosure are sufficiently large such that the bundle can be easily positioned within the flexible envelope without undue risk of damage to the hollow fiber membranes. It is generally desired that the flexible enclosure fits sufficiently snugly around the bundle such that any reduction in size of the lateral dimensions of the flexible enclosure will also result in a lateral compaction of the bundle. Often the interior peripheral dimensions of the flexible envelope approximate (e.g., may be within 20, say, within 10 or 5, percent of) the peripheral dimensions of the uncompacted bundle of hollow fiber membranes.

The flexible envelope may be placed around the bundle in any convenient manner which does not present an undue risk of damage to the hollow fiber membranes. For instance, when the flexible envelope is of a preformed tubular construction, the flexible envelope may be carefully slid over the bundle. If the flexible envelope is in the form of a sheet, the sheet can be wrapped around the bundle in any suitable manner and the seams sealed in an essentially fluid tight manner. Prior to providing the pressure differential across the wall of the flexible envelope, the flexible envelope should be in an essentially fluit tight relationship surrounding the bundle. For example, if the flexible envelope is a preformed tube, the ends may need to be sealed in a fluid tight manner.

The pressure differential across the wall of the flexible envelope may be achieved in any suitable manner. For instance, the pressure at the exterior of the flexible envelope could be increased to provide the pressure differential which causes the flexible envelope to laterally compact the bundle. More frequently, the flexible envelope is in communication with a vacuum source in order to provide the desired pressure differential. The pressure differential employed is determined, at least in part, by the amount of lateral compacting of the bundle which is desired. Often, the pressure differential across the wall of the flexible envelope is less than about 5 atmospheres, e.g., less than about 1 atmosphere, say, about 0.1 to 1 atmosphere. Preferably, prior to subjecting the flexible envelope to the pressure differential, the bundle is arranged in the desired configuration for insertion into the permeator shell. In many instances the lateral compaction provided by the pressure differential across the wall of the flexible envelope results in the bundle and envelope assembly becoming relatively inflexible such that the changing of the configuration of the bundle becomes more difficult. However, this reduction in flexibility of the bundle often facilitates the handling of the bundle and its insertion into the permeator shell.

The flexible envelope and bundle assembly is inserted into the shell while the pressure differential is maintained across the wall of the flexible envelope. If the assembly does not readily slide into the permeator shell by pushing, it may be desired to utilize means to provide additional forces to assist in drawing the assembly into the permeator shell. For instance, one end of the bundle may be adapted to receive a cord wherein the cord can be pulled in order to draw the assembly into the permeator shell. Often sufficient contact exists between the envelope and the bundle that any pulling forces on the flexible envelope will be distributed over the bundle. Thus, a cord may be attached directly to the flexible envelope to assist in guiding and drawing the assembly into the permeator shell. Reinforcements (such as reinforcing tape or other reinforcing members) may be positioned longitudinally on or within the wall of the flexible envelope in order to provide additional strength in a longitudinal direction to the flexible envelope and provide resistance to stretching to the flexible envelope during such operations for guiding and drawing the bundle into the permeator shell. Instead of being attached to the envelope, the cord can be attached to the reinforcements. Alternatively, the bundle may contain one or more reinforcements such as substantially dimensionally stable wires, cords, etc., which are attached to at least one end of the bundle, e.g., by being embedded in a tube sheet, and the cord may be attached to this reinforcement.

The method of this invention may find application in inserting bundles having a wide variety of cross-sectional configurations and dimensions into permeator shells. The cross-sectional configuration of the bundle may, for instance, be circular, oval, polygonal, free form or the like. Preferably, the bundle has an essentially circular cross-sectional configuration. The maximum cross-sectional dimension of a bundle may often be up to one meter or more. Most frequently, the bundles have a maximum cross-sectional dimension of at least about 0.2, e.g., about 0.05 to 0.5 or 1 meter.

The methods of this invention may be useful in fabricating permeators which vary widely in packing factors. A packing factor, as used herein, is the percentage of a given cross-sectional area which is occupied by hollow fiber membranes (including the area occupied by the bores of the hollow fiber membranes). The packing factor based on the inside cross-sectional dimensions of the permeator shell and the cross-sectional area of the hollow fiber membranes for permeators fabricated in accordance with a method of this invention is preferably at least about 35, say about 40 or 45, percent. Since the methods of this invention permit high packing factors to be achieved, it is often desirable that the packing factor based on the inside cross-sectional dimensions of the permeator shell be at least 50 percent, and the packing factor may be up to about 65 to 70 percent. Most often the packing factor based on the inside cross-sectional dimensions of the permeator shell is about 50 to 65 percent.

The hollow fiber membranes may be of any suitable cross-sectional configuration although most frequently, hollow fiber membranes have an essentially circular cross-sectional configuration with a concentric bore.

The hollow fiber membranes may be of any cross-sectional dimension suitable for fluid separations. Often the outside diameters of substantially circular hollow fiber membranes are up to about 800 or 1000 microns. Preferably, the outside diameter of the hollow fiber membranes is about 50 to 800 microns, say, about 150 to 800 microns.

Figure 2:
FIGS. 2 and 3 are representations of hollow fibers having crimps.
Figure 3:

Particularly advantageous hollow fiber membranes for fluid separations have waves, or crimps as shown, for instances, in FIGS. 2 and 3. Low amplitude crimps are preferred. The crimp amplitude is referred to herein as one-half the lateral distance between the mid-point of the hollow fiber membrane at one apex to the mid-point of the hollow fiber membrane at the next adjacent, diametrically opposed apex. When no adjacent diametrically opposed apex exists, the amplitude is the lateral distance between the mid-point of the hollow fiber at the apex to the mid-point of the hollow fiber which is not crimped. The low amplitude crimps advantageously have an amplitude of less than about 50 percent of the diameter of the hollow fiber membranes, and generally, the amplitude of the crimp is within the range of about 1 to 30 percent of the diameter of the hollow fiber membrane.

Each of the crimps in a hollow fiber membrane or among the hollow fiber membranes employed to form the bundle may have the same or different amplitudes than other crimps, and the amplitudes of the crimps may vary over a range to assist in breaking any register between hollow fiber membranes. Moreover, the bundle may contain hollow fiber membranes having substantially no crimps, which hollow fiber membranes can be interspersed with hollow fiber membranes having crimps. The crimps need not be continuous over the length of the hollow fiber membrane. Thus, the crimps may be intermittently spaced over the length of the hollow fiber, and the frequency of the crimps may be irregular.

Some lateral compression of a bundle having at least a portion of hollow fiber membranes having crimps, serves to maintain the hollow fiber membranes in a substantially fixed relationship to each other. In accordance with an aspect of the method of this invention, a bundle of hollow fiber membranes can be laterally compacted such that the bundle can be inserted in a permeator shell and the bundle remains under lateral compression once inserted in the permeator shell.

FIG. 1 is provided to assist in further describing the invention and is a schematic depiction of an arrangement suitable for performing a method in accordance with this invention.

Permeator shell 10 is provided with flanges 12 and 14 at each end which are adapted to receive closure caps. Flexible tube 16 passes longitudinally through permeator shell 10 with one end being in communication with vacuum source 18. The other end of flexible tube 16 is in communication with the interior of flexible envelope 20. Flexible envelope 20 is in the form of a tube which surrounds bundle 22 of a large plurality of hollow fiber membranes. One end of bundle 22 is sealed to fluid communication, and the other end is embedded into tube sheet 24 through which the bores of the hollow fibers communicate. The sealed end of bundle 22 will be the first portion of the bundle which is drawn into the permeator shell 10. Thus, flexible tube 16 is connected to the flexible envelope 20 at a position adjacent the sealed end of bundle 22. As depicted, an essentially fluid tight seal between flexible envelope 20 and flexible tube 16 is achieved by the use of adhesive tape 26. The other end of flexible envelope 20 is attached to the side of tube sheet 24 in a fluid tight manner by the use of adhesive tape 28.

In performing a method in accordance with the invention, a vacuum is drawn within flexible enclosure 20 by the vacuum source 18. This vacuum results in flexible envelope 20 collapsing and tightly surrounding bundle 22 to radially constrict the bundle. This collapsing will often make the bundle more rigid thereby facilitating its insertion into the permeator shell 10. After the flexible envelope is collapsed to constrict the bundle, the bundle may be inserted in permeator shell by a combination of pushing the bundle into the permeator and by pulling flexible tube 16 to position and draw the bundle into the permeator shell. After the bundle is substantially placed within the permeator shell, flexible tube 16 may be connected to a pressurized air supply to expand flexible envelope 20. After expanding flexible envelope 20, tape 28 which connects the flexible envelope to tube sheet 24 may be removed. The flexible envelope can then be withdrawn from the permeator shell by pulling on the flexible tube and the flexible envelope. After the removal of the flexible envelope, the remaining assembly of the permeator can be conducted.

For example, approximately 1360 anisotropic hollow fiber membranes having a circular cross-sectional configuration with an outside diameter of about 559 microns are formed into a bundle having a length of about 3 meters. One end of the bundle has a tube sheet and the other end is sealed with a cast resin. A polyethylene tube having a diameter of about 4.45 centimeters and a wall thickness of about 100 microns is placed around the bundle. At one end of the bundle, the polyethylene tube is stretched to expand around the tube sheet and is fastened By adhesive tape to the periphery of the tube sheet. The other end of the polyethylene tube is fastened to a flexible hose in communication with a vacuum pump. The end of the flexible hose is within the polyethylene tube and is surrounded by porous felt. The porous felt extends past the sealed end to the hollow fiber membrane bundle and prevents the vacuum from collapsing the polyethylene tube between the end of the flexible hose and the bundle. A strip of fiber reinforced adhesive tape (2.5 centimeter width) is secured on the outside of the polyethylene tube in a longitudinal direction to provide strength. The outside of the polyethylene tube is coated with mineral oil as a lubricant. The flexible hose passes through a permeator shell having an internal diameter of about 2.4 centimeters. The bundle is maintained substantially straight and a vacuum is drawn using the vacuum pump. The vacuum is about 0.97 atmosphere. The bundle is then pulled into the shell. The vacuum is terminated and the flexible hose is briefly connected to a laboratory air supply (about 4 atmospheres absolute) to pressurize the interior of the polyethylene tube. The compressed air is terminated, the tape fastening the polyethylene tube to the tube sheet is removed, and the polyethylene tube is removed from the shell. The packing factor of the bundle in the shell is calculated to be about 59.8 percent.

It is claimed:

1. A method for inserting a bundle of hollow fiber membranes for fluid separations into a permeator shell comprising surrounding the bundle with a substantially fluid impermeable, flexible envelope; providing the interior of the flexible envelope at a lower total pressure than the pressure at the exterior of the flexible envelope such that the flexible envelope laterally compacts the bundle; and inserting the flexible envelope containing the bundle into the permeator shell while maintaining the interior of the flexible envelope at a lower total pressure than the pressure at the exterior of the flexible envelope.

2. The method of claim 1 wherein the difference in total pressure between the exterior and interior of the flexible envelope is less than about 5 atmospheres.

3. The method of claim 2 wherein the difference in total pressure between the exterior and interior of the flexible envelope is about 0.1 to 1 atmosphere.

4. The method of claim 1 or 3 wherein the interior of the flexible envelope is at subatmospheric pressure.

5. The method of claim 1 wherein the flexible envelope is removed after the bundle is substantially inserted into the permeator shell.

6. The method of claim 5 wherein the flexible envelope is removed by providing the interior of the flexible envelope at a higher total pressure than the pressure at the exterior of the flexible envelope such that the flexible envelope expands away from the hollow fiber membranes and is withdrawn.

7. The method of claim 1 wherein at least a portion of the hollow fiber membranes have crimps.

8. The method of claim 7 wherein the lateral compaction of the bundle by the flexible envelope provides compression on the crimps.

9. The method of claim 1 wherein the lateral compaction of the bundle by the flexible envelope is sufficient to reduce the flexibility of the bundle to a change in configuration.

10. The method of claim 1 or 9 wherein the bundle is provided in a configuration suitable to insertion into the permeator shell prior to providing the interior of the flexible envelope at a lower total pressure than the pressure at the exterior of the flexible envelope.

11. The method of claim 1 wherein the flexible envelope is of a preformed tubular construction.

12. The method of claim 1 wherein the packing factor of the hollow fiber membranes in the permeator shell is at least about 45 percent.

13. The method of claim 1 wherein the packing factor of the hollow fiber membranes in the permeator shell is about 50 to 65 percent.

14. The method of claim 1 wherein the permeator shell has a substantially circular cross-sectional configuration.

15. The method of claim 1, 7 or 13 wherein the hollow fiber membranes have a substantially circular cross-sectional configuration.

* * * * *